United States Patent
Nakagawa (10) Patent No.: US 10,257,386 B2
(45) Date of Patent: Apr. 9, 2019

(54) IMAGE FORMATION BASED ON IMAGE DATA WITH SMALLEST ERROR GENERATED USING ONE OF PLURAL DITHER MATRICES

(71) Applicant: FUNAI ELECTRIC CO., LTD., Osaka (JP)

(72) Inventor: Kotaro Nakagawa, Kodoma (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/473,615

(22) Filed: Mar. 30, 2017

(65) Prior Publication Data

US 2017/0289400 A1 Oct. 5, 2017

(30) Foreign Application Priority Data

Mar. 31, 2016 (JP) ................. 2016-073229

(51) Int. Cl.
*H04N 1/00* (2006.01)
*H04N 1/40* (2006.01)
(Continued)

(52) U.S. Cl.
CPC ......... *H04N 1/405* (2013.01); *H04N 1/00005* (2013.01); *H04N 1/00031* (2013.01);
(Continued)

(58) Field of Classification Search
CPC .......... H04N 1/405–1/407; H04N 1/52; H04N 1/6027; H04N 1/00031; H04N 1/00039;
(Continued)

(56) References Cited

U.S. PATENT DOCUMENTS

| 4,727,430 A * | 2/1988 | Miwa ................. H04N 1/40012 358/3.11 |
| 5,541,743 A * | 7/1996 | Shiomi ................. H04N 1/405 358/453 |

(Continued)

FOREIGN PATENT DOCUMENTS

| CN | 101462411 | 6/2009 |
| EP | 3125521 | 2/2017 |

(Continued)

OTHER PUBLICATIONS

Wang; Jun-Fang et al, "Study of Binarization of Fax Image," Proceeding of 2006 annual conference of Sichuan Institute of Communications, vol. 2, Dec. 1, 2006, pp. 755-759.

*Primary Examiner* — Scott A Rogers
(74) *Attorney, Agent, or Firm* — JCIPRNET (57) ABSTRACT

An image forming device is provided, including a generation part, a determination part and a printing part. The generation part generates a plurality of types of binarized image data with respect to original image data. The determination part determines the binarized image data, in which an error between each of the plurality of the types of the binarized image data and the original image data is smaller, among the plurality of the types of the binarized image data. The printing part prints the binarized image data determined by the determination part on a medium.

19 Claims, 9 Drawing Sheets

(51) Int. Cl.
*H04N 1/405* (2006.01)
*H04N 1/52* (2006.01)

(52) U.S. Cl.
CPC ....... *H04N 1/00068* (2013.01); *H04N 1/4052* (2013.01); *H04N 1/4053* (2013.01); *H04N 1/40062* (2013.01); *H04N 1/52* (2013.01)

(58) Field of Classification Search
CPC ............. H04N 1/00042; H04N 1/0005; H04N 1/00063; H04N 1/00068; G06K 15/1881
See application file for complete search history.

(56) References Cited

U.S. PATENT DOCUMENTS

| | | | | |
|---|---|---|---|---|
| 5,745,660 A | * | 4/1998 | Kolpatzik | H04N 1/4051 358/3.19 |
| 5,978,554 A | * | 11/1999 | Hakamada | H04N 1/4055 358/1.9 |
| 6,100,996 A | * | 8/2000 | Amano | H04N 1/00002 358/1.14 |
| 6,385,344 B2 | * | 5/2002 | Irie | H04N 1/405 358/1.9 |
| 6,404,508 B1 | * | 6/2002 | Ota | G06K 15/02 358/1.9 |
| 6,731,800 B1 | * | 5/2004 | Barthel | H04N 1/41 382/176 |
| 6,868,183 B1 | * | 3/2005 | Kodaira | G06K 9/00456 382/176 |
| 8,553,287 B2 | * | 10/2013 | Yasutomi | H04N 1/4058 358/3.06 |
| 8,643,904 B2 | * | 2/2014 | Kuno | H04N 1/405 358/1.2 |
| 8,848,252 B2 | * | 9/2014 | Shimahashi | G06K 15/1877 358/3.13 |
| 2002/0054354 A1 | | 5/2002 | Fukao | |
| 2006/0197989 A1 | | 9/2006 | Herron | |
| 2017/0289399 A1 | * | 10/2017 | Toshihiro | G06T 7/11 |

FOREIGN PATENT DOCUMENTS

| | | |
|---|---|---|
| JP | S62269471 | 11/1987 |
| JP | 2007-067984 | 3/2007 |

* cited by examiner

IMAGE FORMATION BASED ON IMAGE DATA WITH SMALLEST ERROR GENERATED USING ONE OF PLURAL DITHER MATRICES

CROSS-REFERENCE TO RELATED APPLICATION

This application claims the priority benefit of Japan application serial no. 2016-073229, filed on Mar. 31, 2016. The entirety of the above-mentioned patent application is hereby incorporated by reference herein and made a part of this specification.

BACKGROUND OF THE INVENTION

Field of the Invention

The invention relates to an image forming device for forming binarized image data.

Description of Related Art

Inkjet printers, laser printers, etc., for example, are known as image forming devices or printing devices that print binarized image data by forming a large number of dots on paper. Such printing devices change the number of dots formed in a certain area on the paper, so as to represent a pseudo-intermediate gradation of the binarized image data (refer to Patent Literature 1: Japanese Patent Publication No. 2007-67984, for example).

With respect to the conventional printing devices, the binarized image data, including black pixels that form the dots and white pixels that do not form the dots, is generated by executing a halftone process on each pixel value of multiple pixels included in multi-gradation original image data. The aforementioned halftone process has several types, such as halftone process by a dither method, halftone process by an error diffusion method, and so on.

SUMMARY OF THE INVENTION

In terms of the aforementioned conventional printing devices, since the halftone process is fixed to one type in advance, the image quality of the binarized image data may vary due to compatibility between the original image data and the type of the halftone process.

In view of the above, the invention provides a printing device that is capable of suppressing the unevenness in the image quality of the binarized image data.

In view of the aforementioned, according to one embodiment, the disclosure provides a printing device, including a generation part, a determination part and a printing part. The generation part generates a plurality of types of binarized image data with respect to original image data. The determination part determines the binarized image data, in which an error between each of the plurality of the types of the binarized image data and the original image data is smaller, among the plurality of the types of the binarized image data. The printing part prints the binarized image data determined by the determination part on a medium.

According to one embodiment, in the aforementioned image forming device, the image forming device comprises a division part dividing the original image data into a plurality of blocks. Further, according to one embodiment, in the aforementioned image forming device, the generation part generates the plurality of the types of the binarized image data by executing a plurality of types of processes on each of the blocks.

According to one embodiment, in the aforementioned image forming devices, the image forming device respectively calculates an error between each of the plurality of the types of the binarized image data and the blocks for each of the blocks. In addition, the determination part determines the binarized image data, in which the error that is calculated is smaller, among the plurality of the types of the binarized image data for each of the blocks.

According to one embodiment, in the aforementioned image forming devices, the printing part prints the binarized image data that is determined on the medium for each of the blocks.

According to one embodiment, in the aforementioned image forming devices, the blocks are arranged side by side along a predetermined direction of the binarized image data by the printing part. In addition, according to one embodiment, in the aforementioned image forming devices, the predetermined direction can be a printing direction of the binarized image data.

According to one embodiment, in the aforementioned image forming devices, image forming device comprises a calculation part, respectively calculating the error between each of the plurality of the types of the binarized image data and the original image data.

According to one embodiment, in the aforementioned image forming devices, each of the plurality of the types of the binarized image data comprises a plurality of first pixels and a plurality of second pixels.

According to one embodiment, in the aforementioned image forming devices, the calculation part calculates an error between a pixel value of a pixel included in the original image data and a pixel value of the first pixel or a pixel value of the second pixel of the binarized image data corresponding to the pixel included in the original image data.

According to one embodiment, in the aforementioned image forming devices, the calculation part uses a pixel value that corresponds to a density of a background color of the medium as the pixel value of the first pixel when calculating the error.

According to one embodiment, in the aforementioned image forming devices, the image forming device prints the binarized image data on the medium with a recording agent. Further, according to one embodiment, in the aforementioned image forming devices, the calculation part uses a pixel value that corresponds to a density of a color of the recording agent as the pixel value of the second pixel when calculating the error. In one embodiment, the recording agent can be an ink or a toner.

According to one embodiment, in the aforementioned image forming devices, the plurality of the types of the processes comprise an error diffusion method and/or a dither method. Alternatively, in one embodiment, the plurality of the types of the processes are a dither method using a plurality of types of dither matrices. Further, the plurality of the types of the dither matrices have different sizes or different threshold values.

According to one embodiment, in the aforementioned image forming devices, the image forming device comprises an acquisition part acquiring the original image data. In addition, in the aforementioned embodiments, the first pixel and the second pixel are a white pixel and a black pixel respectively.

According to this embodiment, the determination part preferentially determines the binarized image data, in which the error calculated by the calculation part is smaller, among the multiple types of the binarized image data. Among the multiple types of halftone processes, the halftone process corresponding to the binarized image data as determined is considered to be more compatible with the original image data. Therefore, by printing the binarized image data as determined on the paper, the unevenness in the image quality of the binarized image data can be suppressed.

According to above embodiments, the division part divides the original image data into a plurality of blocks, and the generation part generates multiple types of the binarized image data for each block. Accordingly, the calculation part calculates the error for each block. Therefore, it is possible to determine the binarized image data corresponding to the halftone process that is more compatible with the original image data for each block. As a result, the unevenness in the image quality of the binarized image data can be more effectively suppressed.

According to above embodiments, the blocks can be arranged side by side along the printing direction of the binarized image data of the printing part. Therefore, for example, after the binarized image data for a certain block is determined, the determination of the binarized image data for a block adjacent to the certain block can be started simultaneously when printing of the binarized image data for the certain block is started. Thereby, the time required for the printing device to carry out the processes can be shortened.

According to above embodiments, when calculating the error, the calculation part uses the pixel value corresponding to the density of the background color of the paper as the pixel value of the white pixel of the binarized image data. Thereby, the density of the background color of the paper is taken into consideration when the error is calculated by the calculation part. Thus, the error can be calculated with high accuracy.

According to above embodiments, when calculating the error, the calculation part uses the pixel value corresponding to the density of the color of the black ink (an example of the recording agent) as the pixel value of the black pixel of the binarized image data. Thereby, the density of the color of the black ink is taken into consideration when the error is calculated by the calculation part. Thus, the error can be calculated with high accuracy.

According to above embodiments, when calculating the error, the calculation part uses the pixel value corresponding to the density of the color of the black toner (an example of the recording agent) as the pixel value of the black pixel of the binarized image data. Thereby, the density of the color of the black toner is taken into consideration when the error is calculated by the calculation part. Thus, the error can be calculated with high accuracy.

According to the above embodiments, at least one of the halftone process performed by the dither method and the halftone process performed by the error diffusion method can be used as the multiple types of halftone processes.

According to the above embodiments, the halftone process performed by the dither method using multiple types of dither matrices that have different sizes and/or threshold values can be used as the multiple types of halftone processes.

According to the printing device of an embodiment of the disclosure, the unevenness in the image quality of the binarized image data can be suppressed.

DESCRIPTION OF THE EMBODIMENTS

Hereinafter, embodiments of the invention are described in detail with reference to the figures. The embodiments described below are all inclusive or specific examples. The values, shapes, materials, components, arrangement positions and connection forms of the components, steps and order of the steps, and so on in the following embodiments are merely examples and are not intended to limit the invention. Moreover, among the components in the following embodiments, those that are not recited in the independent claims are described as optional components. The figures are not necessarily drawn to precisely show the dimensions or dimensional ratios.

First Embodiment 1-1. Functional Configuration of the Printing Device

Figure 1:
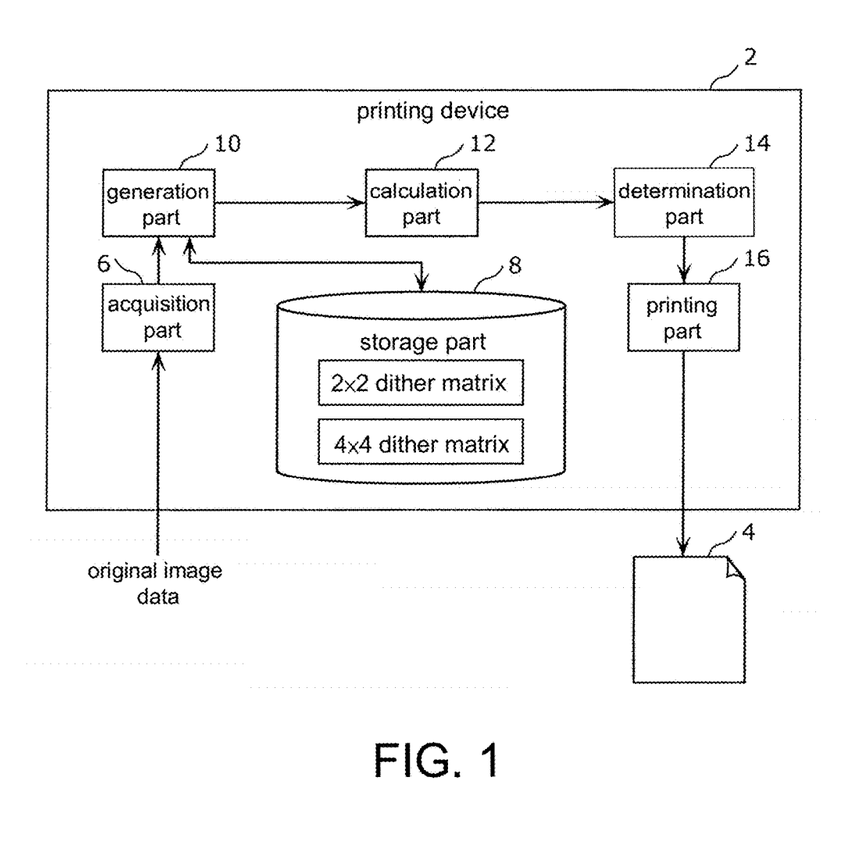
FIG. 1 is a block diagram showing the functional configuration of the printing device according to the first embodiment.

First, a functional configuration of An image forming device 2 of the first embodiment is described with reference to FIG. 1. In this and following embodiments, a printing device will be used to explain the embodiment as an example for the image forming device. FIG. 1 is a block diagram showing the functional configuration of the printing device 2 according to the first embodiment.

The printing device 2 of the first embodiment is, for example, an inkjet printer for printing binarized image data by forming a large number of dots on paper (an example of medium) 4. As shown in FIG. 1, the printing device 2 includes an acquisition part 6, a storage part 8, a generation part 10, a calculation part 12, a determination part 14, and a printing part 16. The printing device 2 is connected to an external terminal device (e.g., a personal computer) (not shown) in a communicable manner. Besides, the paper 4 is a piece of white plain paper or the like, for example.

The acquisition part 6 acquires original image data that has been transmitted from the external terminal device, for example. The original image data is multi-gradation grayscale image data that has an 8-bit gradation value, for example, and includes a plurality of pixels arranged in a matrix. That is, each of the pixels included in the original image data has a pixel value of "0" to "255."

The storage part 8 is a memory for storing two types of dither matrices that have different sizes and threshold values (e.g., a dither matrix having a size of 2×2 and a dither matrix having a size of 4×4) (so-called dot pattern), for example. Details of the dither matrices will be described later.

The generation part 10 executes two types of halftone processes (a first halftone process and a second halftone process) on each pixel value of the pixels included in the entire original image data, so as to generate two types of binarized image data (first binarized image data and second binarized image data) corresponding to the entire original image data. Each of the two types of halftone processes is a halftone process performed by a dither method that uses the two types of dither matrices stored in the storage part 8. The binarized image data is halftone image data that has a gradation value of one bit, and includes a plurality of pixels arranged in a matrix. That is, each of the pixels included in the binarized image data has a pixel value of "0" or "255" (binary). Here, the pixel having the pixel value of "255" is a white pixel that does not form a dot, and the pixel having the pixel value of "0" is a black pixel that forms a dot. The binarized image data has the same resolution as the original image data, for example.

The calculation part 12 calculates errors respectively between the two types of binarized image data and the original image data. That is, the calculation part 12 calculates the error (e.g., mean square) between the pixel value of the pixel (white pixel or black pixel) included in the binarized image data and the pixel value of the pixel of the original image data corresponding to the aforesaid pixel, respectively for the two types of binarized image data. In the case of calculating a mean square as the error, for example, when the total number of the pixels included in each of the original image data and the binarized image data is N, the pixel value of the pixel included in the binarized image data is $P_i$ (i=1, 2, . . . , N), and the pixel value of the pixel of the original image data corresponding to the pixel of the aforesaid binarized image data is $P_i'$ (i=1, 2, . . . , N), the error Av is calculated according to the following Equation (1).

$$Av = \sum_{i=1}^{N} \frac{(P_j - P_i')^2}{N} \qquad (1)$$

The determination part 14 preferentially determines (or selects) the binarized image data, in which the error calculated by the calculation part 12 is smaller, among the aforementioned two types of binarized image data. That is, the determination part 14 determines the binarized image data, in which the error calculated by the calculation part 12 is the smallest, among the aforementioned two types of binarized image data.

The printing part 16 prints the binarized image data determined by the determination part 14 on the paper 4. The printing part 16 discharges black ink (an example of a recording agent) from a recording head (not shown) to the paper 4 at an appropriate timing while reciprocally moving the recording head in a direction substantially perpendicular to a conveyance direction of the paper 4, so as to form a large number of dots on the paper 4. By forming a large number of dots on the paper 4 in this way, the binarized image data is printed on the paper 4.

1-2. Process Flow of the Printing Device

Figure 2:
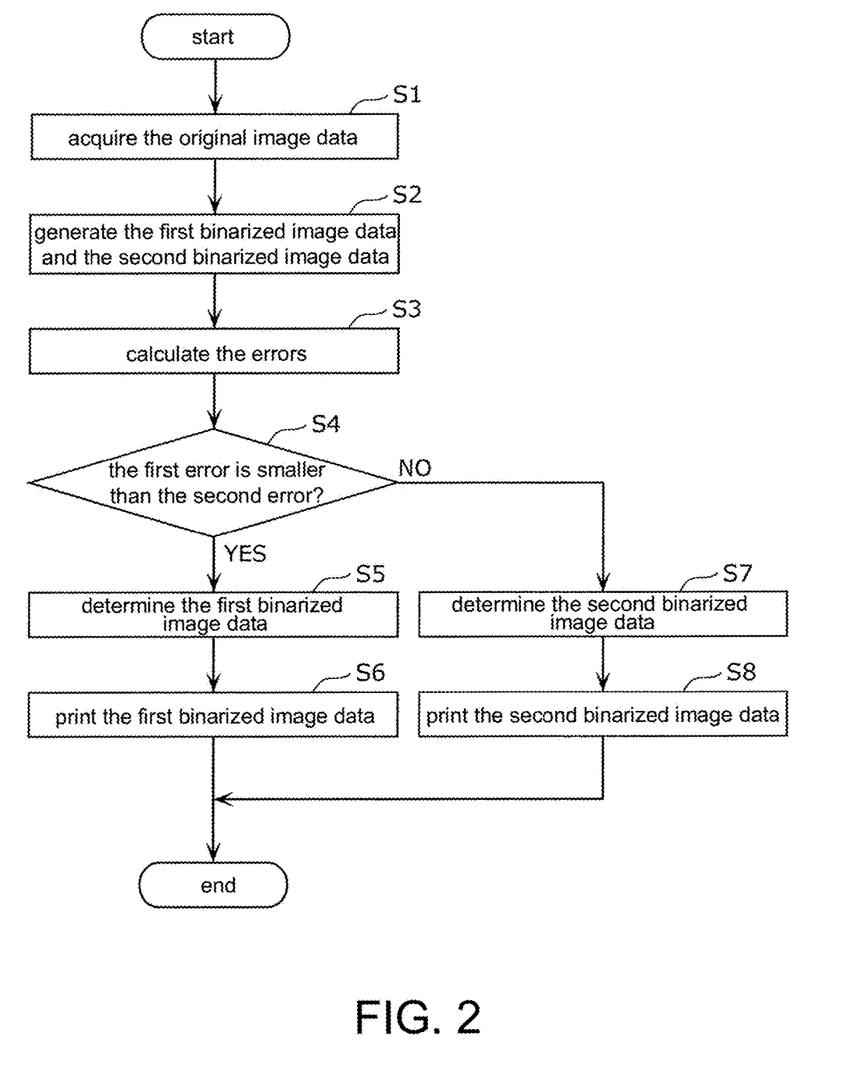
FIG. 2 is a flowchart showing the flow of processes performed by the printing device according to the first embodiment.
Figure 3:
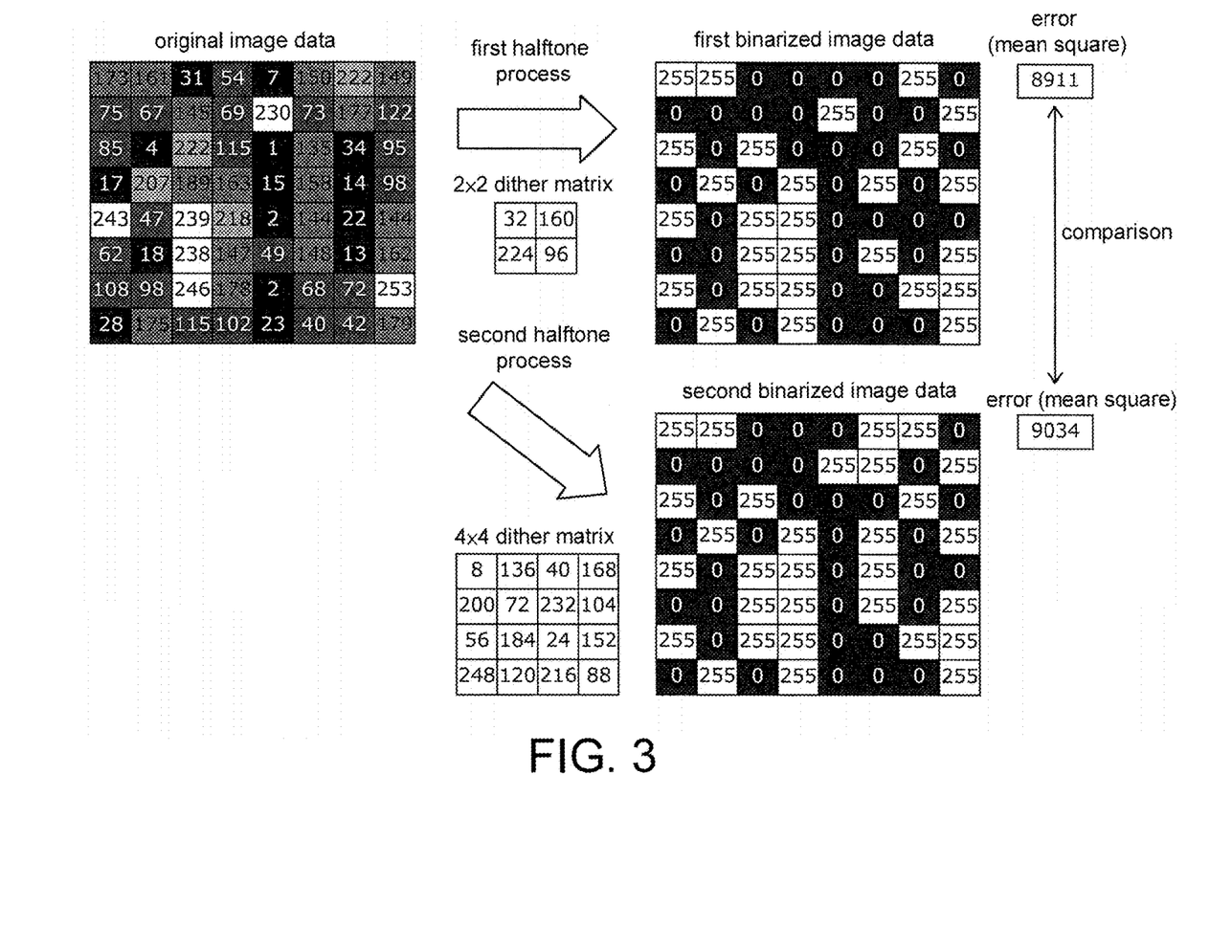
FIG. 3 is a conceptual diagram showing an example of the flow of processes performed by the printing device according to the first embodiment.

Next, a flow of processes performed by the printing device 2 is described with reference to FIG. 2 and FIG. 3. FIG. 2 is a flowchart showing the flow of processes performed by the printing device 2 according to the first embodiment. FIG. 3 is a conceptual diagram showing an example of the flow of processes performed by the printing device 2 according to the first embodiment. To make the following easily comprehensible, in the example shown in FIG. 3, each pixel array of the original image data and the binarized image data is set to a size of 8×8 (that is, the size has 8 pixels in a horizontal direction and 8 pixels in a vertical direction).

As shown in FIG. 2, first, the acquisition part 6 acquires the original image data that has been transmitted from the external terminal device, for example (S1). Then, as shown in FIG. 3, the generation part 10 executes the first halftone process and the second halftone process respectively on each pixel value of the pixels included in the entire original image data, so as to generate the first binarized image data and the second binarized image data (S2). In the example shown in FIG. 3, the first halftone process is a halftone process performed by a dither method that uses a dither matrix having a size of 2×2, and the second halftone process is a halftone process performed by a dither method that uses a dither matrix having a size of 4×4. As shown in FIG. 3, the dither matrix having the size of 2×2 and the dither matrix having the size of 4×4 have different sizes and threshold values.

A brief explanation of the first halftone process and the second halftone process is provided. In the first halftone process, the pixel value of the pixel included in the original image data is compared with the threshold value of the dither matrix having the size of 2×2 corresponding to the aforesaid pixel. Through the comparison, as shown in FIG. 3, if the pixel value of the original image data is larger than the corresponding threshold value of the dither matrix having the size of 2×2, the pixel value is converted to "255," and if the pixel value of the original image data is smaller than the corresponding threshold value of the dither matrix having the size of 2×2, the pixel value is converted to "0." That is, by the first halftone process, the pixel value of the pixel included in the original image data is binarized to either "255" or "0." For example, the pixel values "173," "161," "67," and "75" of the four pixels that occupy the pixel array having the size of 2×2 on the upper left of the original image data shown in FIG. 3 are respectively compared with the threshold values "32," "160," "96," and "224" of the dither matrix having the size of 2×2. As a result, the pixel values "173," "161," "67," and "75" of the original image data are converted to pixel values "255," "255," "0," and "0" respectively.

On the other hand, in the second halftone process, the pixel value of the pixel included in the original image data is compared with the threshold value of the dither matrix having the size of 4×4 corresponding to the aforesaid pixel in the same manner as the first halftone process described above. Through the comparison, as shown in FIG. 3, if the pixel value of the original image data is larger than the corresponding threshold value of the dither matrix having the size of 4×4, the pixel value is converted to "255," and if the pixel value of the original image data is smaller than the corresponding threshold value of the dither matrix having the size of 4×4, the pixel value is converted to "0."

Thereafter, the calculation part 12 calculates an error between the generated first binarized image data and the original image data, and calculates an error between the generated second binarized image data and the original image data (S3). In the example shown in FIG. 3, the error (mean square) between the first binarized image data and the original image data is "8911" and the error (mean square) between the second binarized image data and the original image data is "9034."

Then, the determination part 14 determines the binarized image data, in which the error calculated by the calculation part 12 is the smallest, among the first binarized image data and the second binarized image data. As shown in the example of FIG. 3, if the error (first error) between the first binarized image data and the original image data is smaller than the error (second error) between the second binarized image data and the original image data (YES in S4), the determination part 14 determines the first binarized image data (S5). In this case, the printing part 16 prints the first binarized image data determined by the determination part 14 on the paper 4 (S6).

The process flow returns to Step S4, and if the error obtained by executing the second halftone process is smaller than the error obtained by executing the first halftone process (NO in S4), the determination part 14 determines the second binarized image data (S7). In this case, the printing part 16 prints the second binarized image data determined by the determination part 14 on the paper 4 (S8).

1-3. Effect

The effect achieved by the printing device 2 of the first embodiment will be described hereinafter. As described above, the determination part 14 determines the binarized image data, in which the error calculated by the calculation part 12 is the smallest, among the first binarized image data and the second binarized image data. The halftone process corresponding to the binarized image data determined in this manner is considered to be more compatible with the original image data. Therefore, by printing the binarized image data determined in this manner on the paper 4, the unevenness in the image quality of the binarized image data can be suppressed.

Figure 4A:
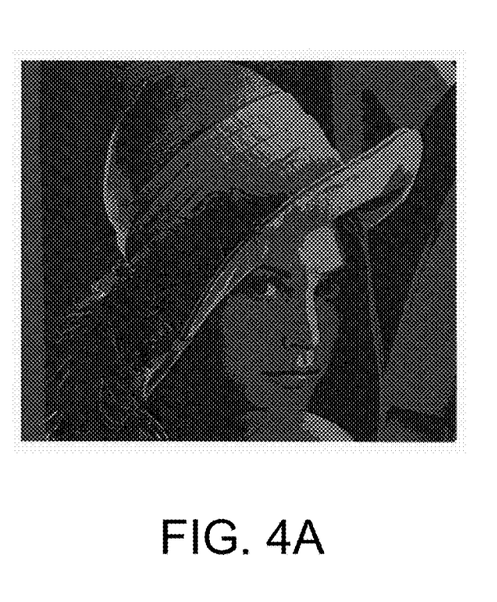
FIG. 4A is a diagram showing an example of the first binarized image data obtained by executing the first halftone process on the original image data.
Figure 4B:
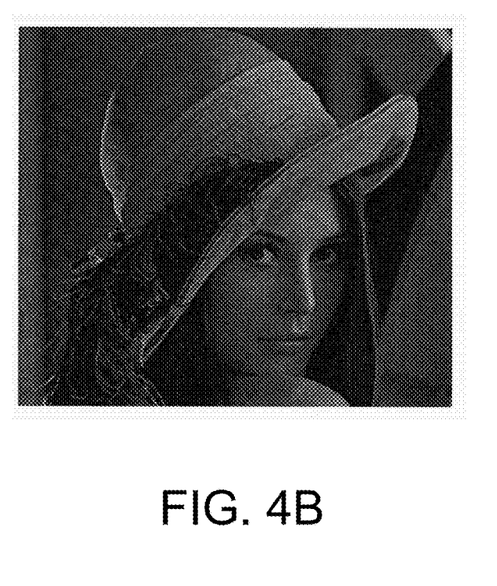
FIG. 4B is a diagram showing an example of the second binarized image data obtained by executing the second halftone process on the original image data.

Here, in order to confirm the aforementioned effect, comparison was performed on the image quality of the first binarized image data and the second binarized image data obtained by respectively executing the first halftone process and the second halftone process on the original image data (so-called Lenna image). FIG. 4A is a diagram showing an example of the first binarized image data obtained by executing the first halftone process on the original image data. FIG. 4B is a diagram showing an example of the second binarized image data obtained by executing the second halftone process on the original image data.

In the examples shown in FIG. 4A and FIG. 4B, the resolutions of the first binarized image data and the second binarized image data were both 1200 dpi. Moreover, the first halftone process was a halftone process performed by a dither method that used a dither matrix having a size of 2×2, and the second halftone process was a halftone process performed by a dither method that used a dither matrix having a size of 4×4. Furthermore, the error (mean square) between the first binarized image data and the original image data was "14021.225," and the error (mean square) between the second binarized image data and the original image data was "13244.292."

As clearly shown in FIG. 4A and FIG. 4B, it can be said that the image quality of the second binarized image data having the smaller error is higher than the image quality of the first binarized image data. Thus, it was confirmed that the unevenness in the image quality of the binarized image data can be suppressed by determining one of the first binarized image data and the second binarized image data according to the error calculated by the calculation part 12.

Second Embodiment 2-1. Functional Configuration of the Printing Device

Figure 5:
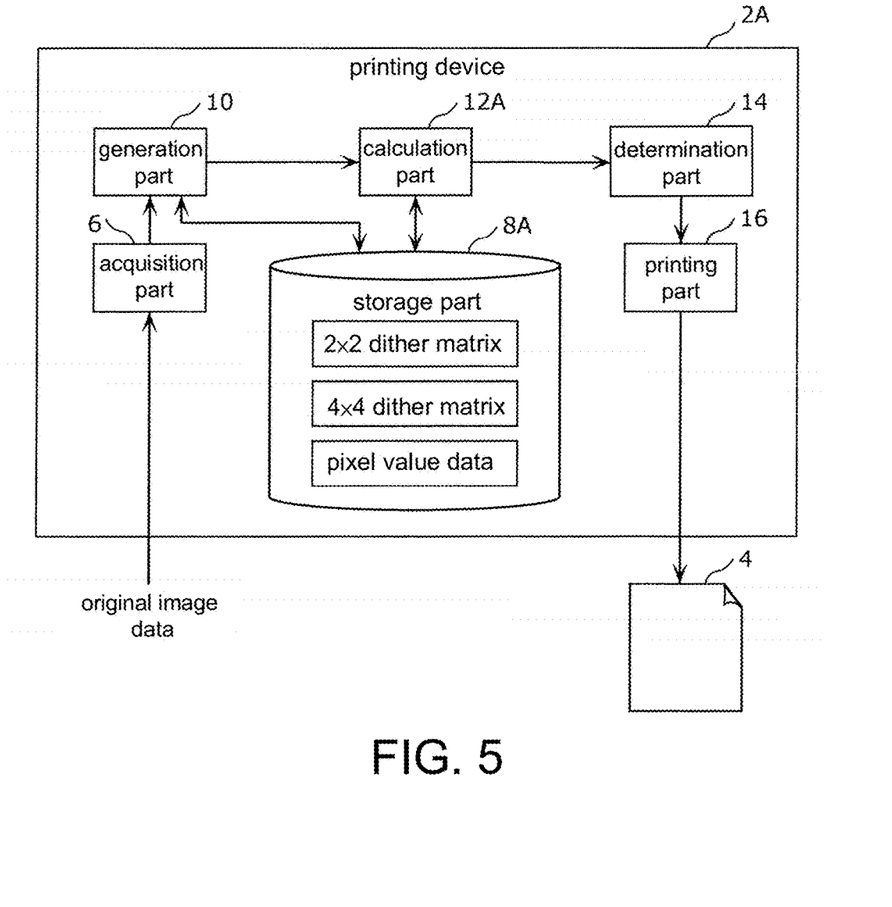
FIG. 5 is a block diagram showing the functional configuration of the printing device according to the second embodiment.
Figure 6:
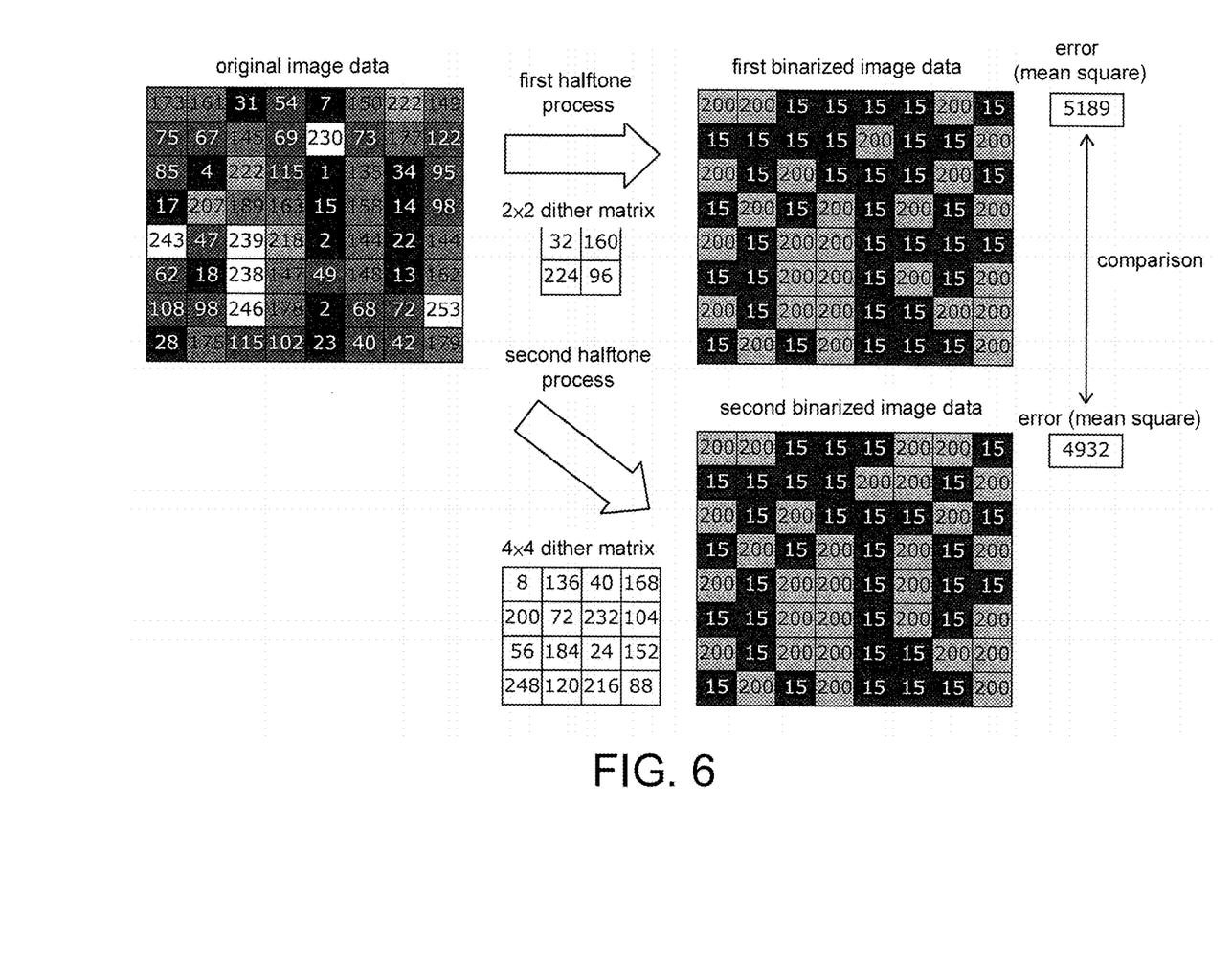
FIG. 6 is a conceptual diagram showing an example of the flow of processes performed by the printing device according to the second embodiment.

Next, a functional configuration of a printing device 2A of the second embodiment is described with reference to FIG. 5 and FIG. 6. FIG. 5 is a block diagram showing the functional configuration of the printing device 2A according to the second embodiment. FIG. 6 is a conceptual diagram showing an example of the flow of processes performed by the printing device 2A according to the second embodiment. In the following embodiments, components the same as those of the first embodiment are assigned with the same reference numerals and descriptions thereof are omitted.

As shown in FIG. 5, the printing device 2A of the second embodiment differs from the first embodiment in the configuration of a calculation part 12A. That is, when calculating the error, the calculation part 12A uses the pixel value "200" corresponding to the density of a background color of the paper 4 (e.g., white plain paper), instead of the pixel value "255" described in the first embodiment, as the pixel value of each white pixel of the first binarized image data and the second binarized image data. Moreover, when calculating the error, the calculation part 12A uses the pixel value "15" corresponding to the density of the color of a black ink used by the printing part 16, instead of the pixel value "0" described in the first embodiment, as the pixel value of each black pixel of the first binarized image data and the second binarized image data.

The pixel value "200" corresponding to the density of the background color of the paper 4 as described above is a density obtained in advance by measuring the density of the background color of the paper 4 with a colorimeter, and is a relative density when a black reference density of a color chart is set to "0" and a white reference density is set to "255." In addition, the pixel value "15" corresponding to the density of the black ink as described above is a density obtained in advance by measuring the density of the dots formed on the paper 4 with the black ink with the colorimeter, and is a relative density when the black reference density of the color chart is set to "0" and the white reference density is set to "255." The pixel values "200" and "15" are respectively stored in advance in a storage part 8A as pixel value data.

In the example shown in FIG. 6, the error (mean square) between the first binarized image data and the original image data is "5189" and the error (mean square) between the second binarized image data and the original image data is "4932."

Accordingly, in the second embodiment, the density of the background color of the paper 4 and the density of the color of the black ink are taken into consideration when the error is calculated by the calculation part 12A. Thus, the error can be calculated with high accuracy.

2-2. Modified Example

The second embodiment illustrates a case where the printing device 2A is an inkjet printer. However, the same processing as described above can be executed even when the printing device 2A is a laser printer.

In the case where the printing device 2A is a laser printer, the printing part 16 fixes a black toner (an example of the recording agent) onto the paper 4, so as to form a large number of dots on the paper 4. In this case, when calculating the error, the calculation part 12A uses the pixel value (e.g., the pixel value "10") corresponding to the density of the color of the black toner used by the printing part 16, instead of the pixel value "0" described in the first embodiment, as the pixel value of each black pixel of the first binarized image data and the second binarized image data.

Third Embodiment 3-1. Functional Configuration of the Printing Device

Figure 7:
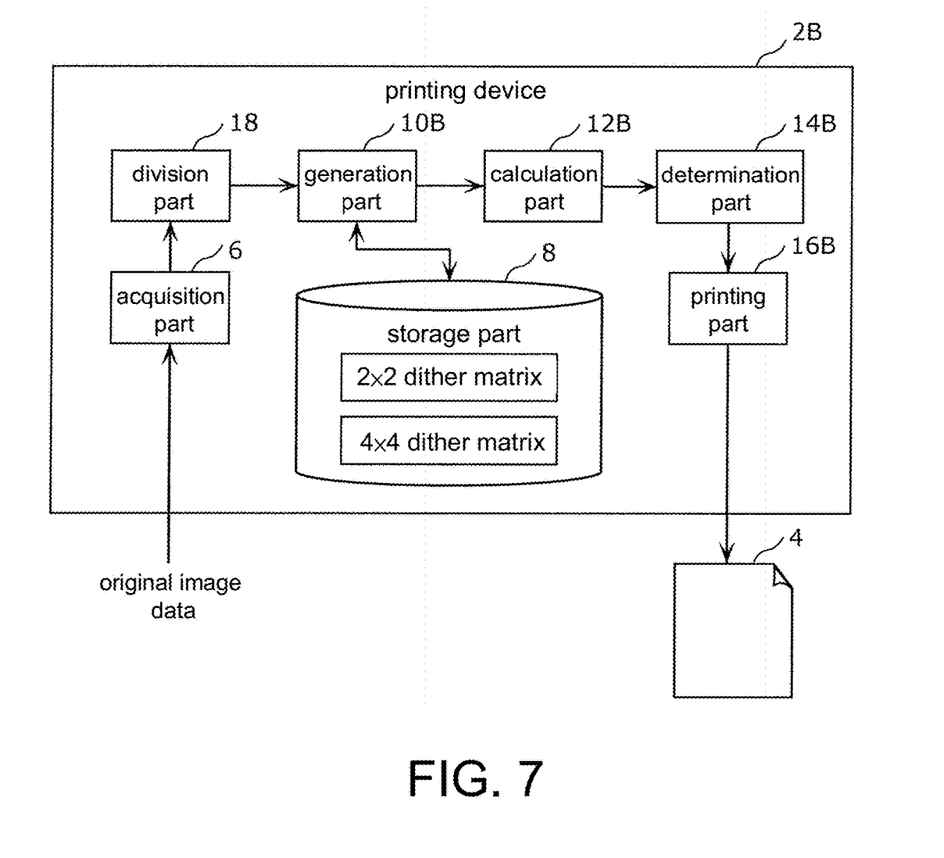
FIG. 7 is a block diagram showing the functional configuration of the printing device according to the third embodiment.

Next, a functional configuration of a printing device 2B of the third embodiment is described with reference to FIG. 7. FIG. 7 is a block diagram showing the functional configuration of the printing device 2B according to the third embodiment.

Figure 9:
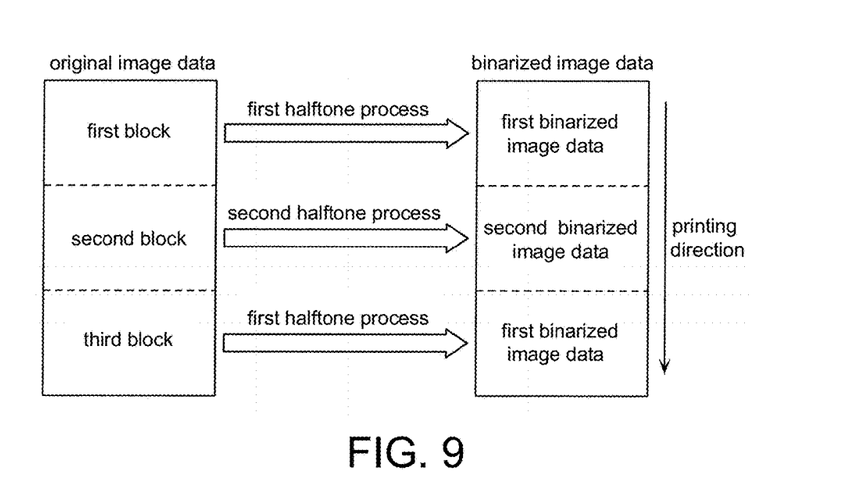
FIG. 9 is a conceptual diagram showing an example of the flow of processes performed by the printing device according to the third embodiment.

As shown in FIG. 7, the printing device 2B according to the third embodiment includes a division part 18 in addition to an acquisition part 6, a generation part 10B, a calculation part 12B, a determination part 14B, and a printing part 16B. The division part 18 divides the original image data acquired by the acquisition part 6 into a plurality of blocks (three, for example). As shown in FIG. 9 (which will be described later), the blocks are arranged side by side along a printing direction (sub-scanning direction) of the binarized image data of the printing part 16B.

The generation part 10B executes the first halftone process and the second halftone process on the blocks, so as to generate the first binarized image data and the second binarized image data corresponding to each of the blocks. For each block, the calculation part 12B calculates the errors between the block and the first binarized image data and between the block and the second binarized image data.

The determination part 14B determines the binarized image data, in which the calculated error is the smallest, among the first binarized image data and the second binarized image data for each block. The printing part 16B prints the determined binarized image data on the paper 4 for each block.

3-2. Process Flow of the Printing Device

Figure 8:
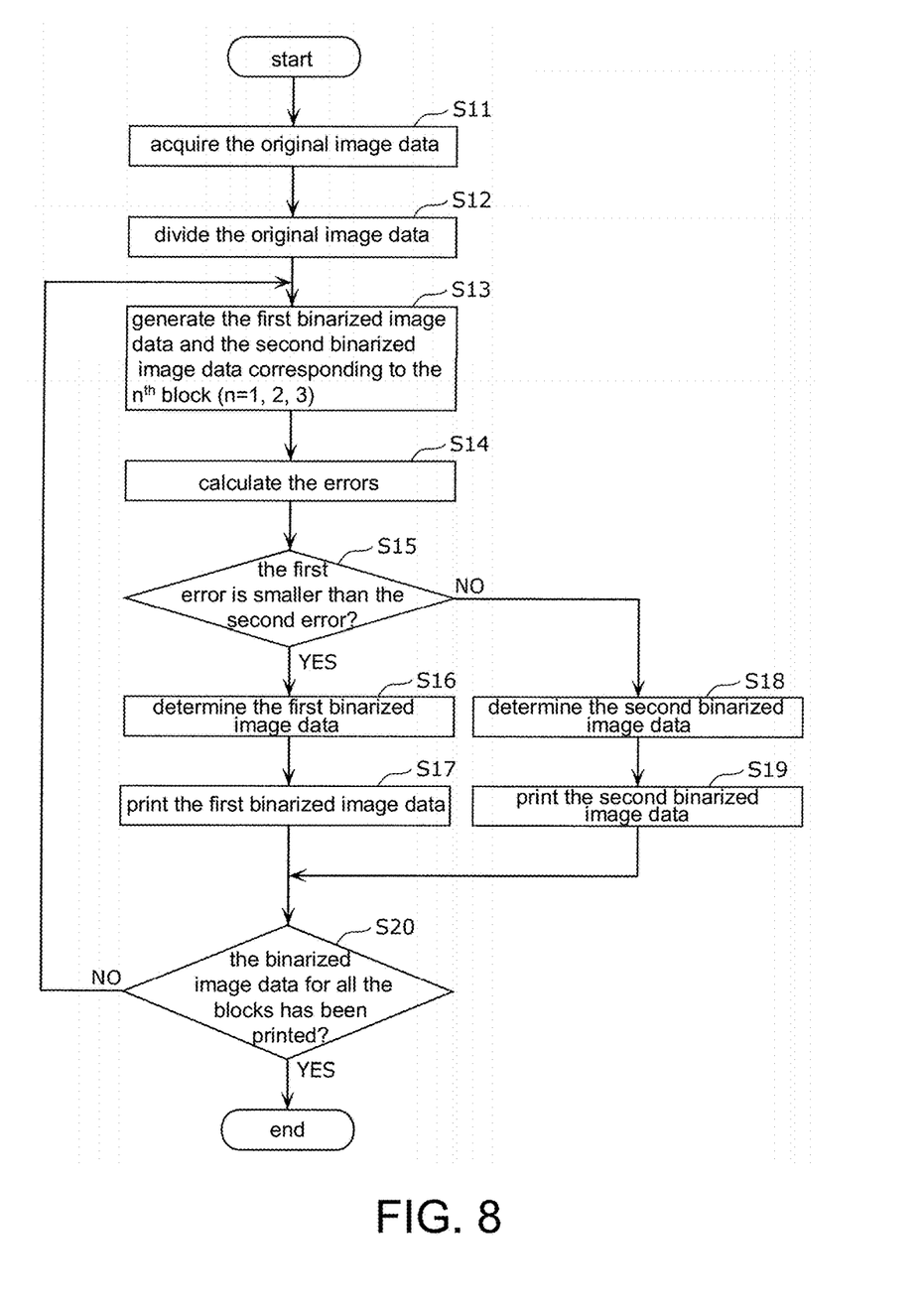
FIG. 8 is a flowchart showing the flow of processes performed by the printing device according to the third embodiment.

Next, a flow of processes performed by the printing device 2B of the third embodiment is described with reference to FIG. 8 and FIG. 9. FIG. 8 is a flowchart showing the flow of processes performed by the printing device 2B according to the third embodiment. FIG. 9 is a conceptual diagram showing an example of the flow of processes performed by the printing device 2B according to the third embodiment.

As shown in FIG. 8, first, the acquisition part 6 acquires the original image data that has been transmitted from the external terminal device, for example (S11). Then, the division part 18 divides the original image data acquired by the acquisition part 6 into a plurality of blocks (S12). In the example shown in FIG. 9, the division part 18 divides the original image data into three blocks (a first block, a second block, and a third block). The three blocks are arranged side by side along a longitudinal direction (i.e., the printing direction of the binarized image data) of the original image data, for example.

Thereafter, the generation part 10B executes the first halftone process and the second halftone process respectively on each pixel value of the pixels included in the first block, so as to generate the first binarized image data and the second binarized image data corresponding to the first block (S13). Thereafter, the calculation part 12B calculates the error between the generated first binarized image data and the first block, and calculates the error between the generated second binarized image data and the first block (S14).

Thereafter, the determination part 14B determines the binarized image data, in which the error calculated by the calculation part 12B is the smallest, among the first binarized image data and the second binarized image data for the first block. As shown in the example of FIG. 9, if the error (first error) between the first binarized image data and the first block is smaller than the error (second error) between the second binarized image data and the first block (YES in S15), the determination part 14B determines the first binarized image data for the first block (S16). In this case, the printing part 16B prints the first binarized image data, as the binarized image data corresponding to the first block, on the paper 4 (S17).

The process flow returns to Step S15, and if the error between the second binarized image data and the first block is smaller than the error between the first binarized image data and the first block (NO in S15), the determination part 14B determines the second binarized image data for the first block (S18). In this case, the printing part 16B prints the second binarized image data, as the binarized image data corresponding to the first block, on the paper 4 (S19).

Next, if the binarized image data (i.e., one of the first binarized image data and the second binarized image data) for the remaining second block and third block is not printed on the paper 4 (NO in S20), the aforementioned Steps S13 to S19 are executed for the second block. In the example shown in FIG. 9, the determination part 14B determines the second binarized image data for the second block, and the printing part 16B prints the second binarized image data, as the binarized image data corresponding to the second block, on the paper 4.

Thereafter, if the binarized image data for the remaining third block is not printed on the paper 4 (NO in S20), the aforementioned Steps S13 to S19 are executed for the third block. In the example shown in FIG. 9, the determination part 14B determines the first binarized image data for the third block, and the printing part 16B prints the first binarized image data, as the binarized image data corresponding to the third block, on the paper 4.

Accordingly, with the printing device 2B according to the third embodiment, the error is calculated for each block. Therefore, it is possible to determine the binarized image data corresponding to the halftone process that is most compatible with the original image data for each block. For example, if the original image data includes both a character area and a photograph area, dividing the original image data into a block including the character area and a block including the photograph area makes it possible to appropriately determine the binarized image data that is respectively compatible with the block including the character area and the block including the photograph area. As a result, the unevenness in the image quality of the binarized image data printed on the paper 4 can be effectively suppressed.

3-3. Modified Example

In the third embodiment, for example, the configuration is made such that determination of the binarized image data for the second block is started after printing of the binarized image data for the first block is completed.

Figure 10:
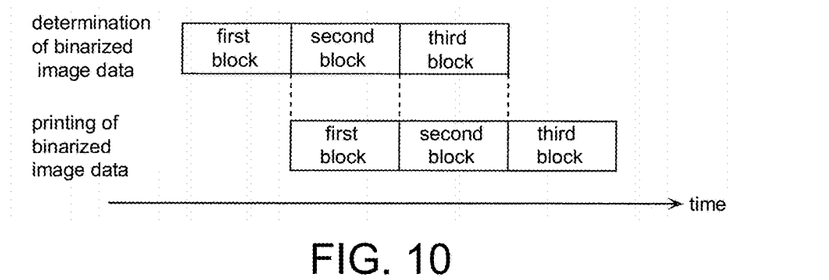
FIG. 10 is a timing chart showing an example of the flow of processes performed by the printing device according to a modified example of the third embodiment.

Instead of this configuration, as shown in FIG. 10, for example, determination of the binarized image data for the second block may be started simultaneously when printing of the binarized image data for the first block is started at a timing when determination of the binarized image data for the first block has been completed. Thereby, the time required for the printing device 2B to carry out the processes can be shortened.

Figure 11:
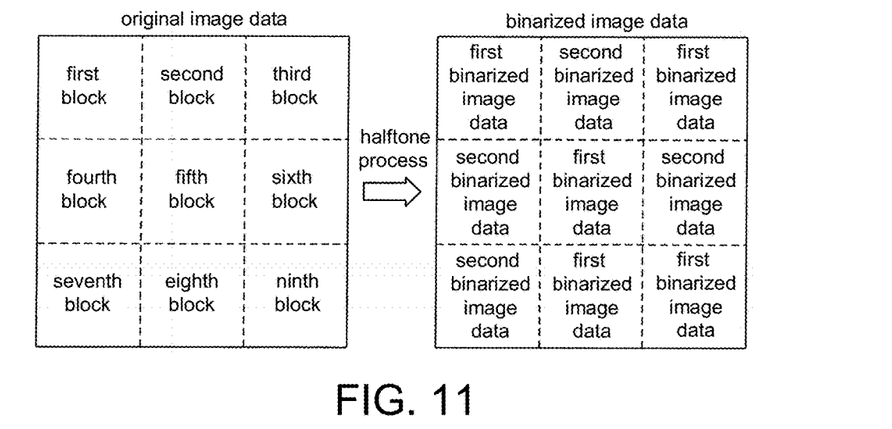
FIG. 11 is a conceptual diagram showing an example of the flow of processes performed by the printing device according to the modified example of the third embodiment.

Moreover, although the division part 18 divides the original image data into three blocks in the third embodiment, the number of the blocks that are divided can be set as desired. In the example shown in FIG. 11, the division part 18 divides the original image data into a total of nine blocks (first block to ninth block). In this way, as the number of the blocks that are divided increases, the unevenness in the image quality of the binarized image data printed on the paper 4 can be more effectively suppressed.

Other Modified Example

The printing devices according to the first to third embodiments of the invention have been described above. Nevertheless, the invention is not limited to the first to third embodiments. For example, the first to third embodiments described above may be combined where appropriate.

For example, in the above embodiments, the printing device 2 (2A, 2B) is constituted by an inkjet printer. However, the invention is not limited thereto, and the printing device 2 (2A, 2B) may also be constituted by a laser printer or a multifunction peripheral (MFP), for example. In the case where the printing device 2 (2A, 2B) is constituted by a multifunction peripheral, the acquisition part 6 acquires the original image data read by a scanner.

For example, in the above embodiments, the generation part 10 (10B) executes two types of halftone processes on the original image data. However, the invention is not limited thereto, and the generation part 10 (10B) may execute three or more types of halftone processes, for example.

For example, in the above embodiments, the generation part 10 (10B) is configured to execute the halftone process by the dither method using multiple types of dither matrices that have different sizes and threshold values. However, the invention is not limited thereto, and the generation part 10 (10B) may execute the halftone process by the dither method using multiple types of dither matrices that have the same sizes but are different only in threshold values, for example.

For example, in the above embodiments, the halftone process by the dither method is used as the halftone process to be executed by the generation part 10 (10B). However, the invention is not limited thereto, and a halftone process by an error diffusion method may be used, for example. Alternatively, a combination of the halftone process by the dither method and the halftone process by the error diffusion method can be used.

Alternatively, the halftone process may be executed with using one of threshold values of multiple types. In this case, for example, a first threshold value (e.g., "128") is used in the first halftone process and a second threshold value (e.g., "135") is used in the second halftone process. For example, in the first halftone process, if the pixel value of the original image data is larger than the first threshold value, the pixel value is converted to "255," and if the pixel value of the original image data is smaller than the first threshold value, the pixel value is converted to "0." Likewise, in the second halftone process, if the pixel value of the original image data is larger than the second threshold value, the pixel value is converted to "255," and if the pixel value of the original image data is smaller than the second threshold value, the pixel value is converted to "0."

For example, in the first embodiment described above, the error is calculated for the entire original image data. However, the invention is not limited thereto, and the error may be calculated for only a part of the original image data.

The printing device of the invention is applicable to serve as an inkjet printer, a laser printer, or the like, for example.

What is claimed is:

1. An image forming device, comprising:
a processor, configured to
generate a plurality of types of binarized image data with respect to original image data by using a same conversion method that uses two types of dither matrices,
determine one type of the binarized image data having a smaller error with respect to the original image data among the plurality of the types of the binarized image data; and
printer part, controlled by the processor to print the type of the binarized image data determined by the processor to have a smaller error with respect to the original image data.

2. The image forming device according to claim 1, wherein the processor is further configured to divide the original image data into a plurality of blocks.

3. The image forming device according to claim 2, wherein the processor generates the plurality of the types of the binarized image data by executing a plurality of types of processes on each of the blocks.

4. The image forming device according to claim 2, wherein the image forming device respectively calculates an error between each of the plurality of the types of the binarized image data and the blocks for each of the blocks,
wherein the processor determines the binarized image data, in which the error that is calculated is smaller, among the plurality of the types of the binarized image data for each of the blocks.

5. The image forming device according to claim 2, wherein the printer part prints the binarized image data that is determined on the medium for each of the blocks.

6. The image forming device according to claim 2, wherein the blocks are arranged side by side along a predetermined direction of the binarized image data by the printer part.

7. The image forming device according to claim 6, wherein the predetermined direction is a printing direction of the binarized image data.

8. The image forming device according to claim 1, wherein the processor is further configured to respectively calculate the error between each of the plurality of the types of the binarized image data and the original image data.

9. The image forming device according to claim 1, wherein each of the plurality of the types of the binarized image data comprises a plurality of first pixels and a plurality of second pixels.

10. The image forming device according to claim 9, wherein the processor calculates an error between a pixel value of a pixel included in the original image data and a pixel value of one of the first pixels or a pixel value of one of the second pixels of the binarized image data corresponding to the pixel included in the original image data.

11. The image forming device according to claim 9, wherein the processor uses a pixel value that corresponds to a density of a background color of the medium as the pixel value of the first pixel when calculating the error.

12. The image forming device according to claim 1, wherein the image forming device prints the binarized image data on the medium with a recording agent.

13. The image forming device according to claim 12, wherein the processor uses a pixel value that corresponds to a density of a color of the recording agent as the pixel value of the second pixel when calculating the error.

14. The image forming device according to claim 12, wherein the recording agent is an ink or a toner.

15. The image forming device according to claim 3, wherein the plurality of the types of the processes comprise an error diffusion method and/or a dither method.

16. The image forming device according to claim 3, wherein the plurality of the types of the processes are a dither method using a plurality of types of dither matrices.

17. The image forming device according to claim 16, wherein the plurality of the types of the dither matrices have different sizes or different threshold values.

18. The image forming device according to claim 1, wherein the processor is further configured to acquire the original image data.

19. The image forming device according to claim 9, wherein the first pixel and the second pixel are a white pixel and a black pixel respectively.

* * * * *